US012276942B2

(12) United States Patent
Delevaux et al.

(10) Patent No.: US 12,276,942 B2
(45) Date of Patent: Apr. 15, 2025

(54) TIMEPIECE DISPLAY MECHANISM

(71) Applicant: ETA SA Manufacture Horlogere Suisse, Grenchen (CH)

(72) Inventors: Fabrice Delevaux, Le Noirmont (CH); Ivan Villar, Brugg (CH); Julien Christan, Bienne (CH); Christophe Cattin, Le Noirmont (CH); Anne Philipps, Selzach (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 387 days.

(21) Appl. No.: 17/785,805

(22) PCT Filed: Oct. 13, 2020

(86) PCT No.: PCT/EP2020/078684

§ 371 (c)(1),
(2) Date: Jun. 15, 2022

(87) PCT Pub. No.: WO2021/121707

PCT Pub. Date: Jun. 24, 2021

(65) Prior Publication Data

US 2023/0057274 A1 Feb. 23, 2023

(30) Foreign Application Priority Data

Dec. 16, 2019 (EP) .................................... 19216640

(51) Int. Cl.
*G04B 19/02* (2006.01)
*G04B 13/02* (2006.01)
(Continued)

(52) U.S. Cl.
CPC ............. *G04B 19/02* (2013.01); *G04B 29/04* (2013.01); *G04B 31/06* (2013.01); *G04B 13/021* (2013.01)

(58) Field of Classification Search
CPC ........ G04B 19/02; G04B 29/04; G04B 31/06; G04B 13/021; G04B 31/00
See application file for complete search history.

(56) References Cited

U.S. PATENT DOCUMENTS 10,048,650 B2 * 8/2018 Balmer .................... G04C 3/14
10,545,460 B2 * 1/2020 Balmer .................. G04B 29/04
(Continued)

FOREIGN PATENT DOCUMENTS

CH 358383 11/1961
CN 104062888 A 9/2014
(Continued)

OTHER PUBLICATIONS

Combined Chinese Office Action and Search Report issued on Jul. 4, 2023 in Chinese Patent Application No. 202080087363.7 (with English translation of category of cited documents), 11 pages.
(Continued)

*Primary Examiner* — Edwin A. Leon
(74) *Attorney, Agent, or Firm* — Oblon, McClelland, Maier & Neustadt, L.L.P.

(57) ABSTRACT

A timepiece display mechanism includes at least one display having a shaft, and having at least one plate and/or a bridge carrying at least one guide device for carrying and guiding this shaft around an axis, including, on a first side of said axis, a support surface comprising a V-shape or a pad, symmetrical with respect to a bisector plane passing through the axis, to centre the axis of the shaft on this bisector plane, and on a second opposite side, at least one holding element substantially diametrically opposite the support surface, all the holding elements exerting on this shaft a resultant elastic return force directed towards the axis, and preventing any radial exit of this shaft out of the guide bearing which is a platform with two parallel faces.

20 Claims, 6 Drawing Sheets

(51) Int. Cl.

| | |
|---|---|
| ***G04B 29/04*** | (2006.01) |
| ***G04B 31/06*** | (2006.01) |

(56) References Cited

U.S. PATENT DOCUMENTS

| | | | | |
|---|---|---|---|---|
| 11,467,539 | B2 * | 10/2022 | Rochat | G04B 35/00 |
| 11,914,327 | B2 * | 2/2024 | Saglini | G04B 13/023 |
| 2014/0286139 | A1 | 9/2014 | Stranczl et al. | |
| 2016/0026154 | A1 | 1/2016 | Courvoisier | |

FOREIGN PATENT DOCUMENTS

| | | | |
|---|---|---|---|
| CN | 108693761 | A | 10/2018 |
| EP | 2 781 971 | A1 | 9/2014 |
| EP | 2 977 829 | A1 | 1/2016 |
| GB | 870989 | | 6/1961 |
| JP | 54-139758 | A | 10/1979 |
| JP | 61-33588 | Y2 | 10/1986 |
| JP | 2014-182145 | A | 9/2014 |

OTHER PUBLICATIONS

Japanese Notice of Reasons for Refusal issued Jul. 4, 2023 in Japanese Application No. 2022-534202, (with English Translation) 8 pages.

International Search Report issued Nov. 19, 2020, in PCT/EP2020/078684 filed Oct. 13, 2020, 2 pages.

* cited by examiner

TIMEPIECE DISPLAY MECHANISM

CROSS-REFERENCE TO RELATED APPLICATIONS

This application is a 371 of International Application No. PCT/EP2020/078684 filed Oct. 13, 2020 and claims the benefit of priority from prior European Application No. 19216640.3 filed Dec. 16, 2019. The entire contents of each of which is incorporated herein by reference.

FIELD OF THE INVENTION

The invention relates to a timepiece display mechanism, comprising at least one display comprising a shaft, and comprising at least one plate and/or a bridge carrying at least one guide device, to carry and guide this shaft.

The invention also relates to a timepiece comprising at least one such timepiece display mechanism, and/or at least one such guide device.

The invention relates to the field of timepiece display mechanisms.

BACKGROUND OF THE INVENTION

In a horological movement, the values of the hours, minutes, and seconds are generally displayed using hands. These hands must not touch each other, nor touch the dial, or components of the movement, or else the crystal.

Several factors influence safety between the hands:

the shake of the bearing shaft of each hand;

the inclination of the shaft, in relation to a plate or a bridge, due to the location, the roundness, the defect in the shape of the guides;

the inclination of the shaft due to the clearances in the guide pivots;

the tolerance chain;

the shape tolerances, and in particular the flatness and perpendicularity of the hand driven onto the shaft.

Naturally, the problem is similar if the displays are not hands, but discs, rings, or the like.

The problem of hands touching each other is also related to the fact that the distance between the shoulders, that is to say the gap between the guide shoulders, of the shaft that supports the hand is relatively short. The lever arm effect considerably amplifies, at the end of the hand, any fault at one of the shaft guides. In this case, it turns out that the main contribution to the decrease in safety between the hands is the inclination due to clearances in the pivots (more than 50%).

Attention is in particular paid here to the variation of the inclination of the seconds hand in one revolution, comparable to a beat.

To prevent the hands from bending and touching each other, at least one foil spring is usually placed on the shaft that supports the hand. The friction torque generated by this foil is very difficult to control, and directly influences the amplitude of the balance wheel, the chronometric performance, and the efficiency of the mechanism. Mechanisms comprising several leaf springs are known, the function of which is to provide both guiding and braking by friction, simultaneously. The equilibrium position of the shaft stems from the rigidity of these spring elements, which are the blades or strips which exert a return force when the shaft is out of its equilibrium position.

The random orientation of such a shaft in the field of gravity, when the timepiece is a watch worn by its user, only makes it more difficult to maintain a shaft perpendicular to a plate or a bridge.

Document EP2781971 in the name of NIVAROX describes a timepiece mechanism structure for receiving and guiding a pivoting wheel set, which comprises an unremovable one-piece structure comprising pivot points aligned in pairs for receiving pivots of such a pivoting wheel set.

Document CH358383 in the name of JUNGHANS describes a device for holding an alarm setting shaft in clocks, which is a radial action element which exerts friction on the shaft.

Document JP S54 13758 in the name of CITIZEN describes an improvement relating to the attachment of a support or pivot stone in a substrate by local fusion by means of a laser.

Document EP2977829 in the name of ETA Manufacture Horlogère Suisse describes a timepiece brake wheel set assembly, comprising a shaft comprising a first surface cooperating in pivoting guiding with a second surface of a wheel pivotally mounted on the shaft, where this second surface comprises a braking surface on a sabot subjected to the action of an elastic return means, integral with the wheel, and arranged to exert a radial force with respect to the pivot axis on said first surface. This assembly comprises intrinsic means for adjusting by discrete values the friction exerted by the braking surface on the first surface.

SUMMARY OF THE INVENTION

The invention proposes to solve the problem of floating of a display, in particular of a display hand, and to prevent a display, such as a small seconds hand, or a power reserve indicator, or the like, from touching another display such as for example the hour hand, and/or from touching the dial or a stationary component of the movement or of the external part by radial guiding.

The invention also proposes to limit as much as possible the variation of the inclination of the display in one revolution.

To avoid any unpleasant optical phenomenon for the user, such as a chattering phenomenon or the like, the invention proposes to limit, or even eliminate, the floating of the display due to clearances, and in particular to gear clearances.

For controlling the chronometric properties, it is also a question of controlling any loss of amplitude induced by the friction of a spring against a shaft.

To this end, the invention relates to a timepiece display mechanism according to claim 1.

The invention also relates to a horological movement comprising at least one such guide device.

The invention also relates to a timepiece, in particular a watch, comprising at least one such horological movement, and/or at least one such guide device.

BRIEF DESCRIPTION OF THE DRAWINGS

Other features and advantages of the invention will appear upon reading the detailed description which follows, with reference to the appended drawings, where:

FIG. 5: cylinder-plan connection;

FIG. 6: cylinder-concave surface connection;

FIG. 7: cylinder-convex surface connection;

FIG. 8: cylinder-plan connection;

FIG. 9: cylinder-convex surface connection;

FIG. 10: cylinder-concave surface connection;

DETAILED DESCRIPTION OF PREFERRED EMBODIMENTS

Figure 1:
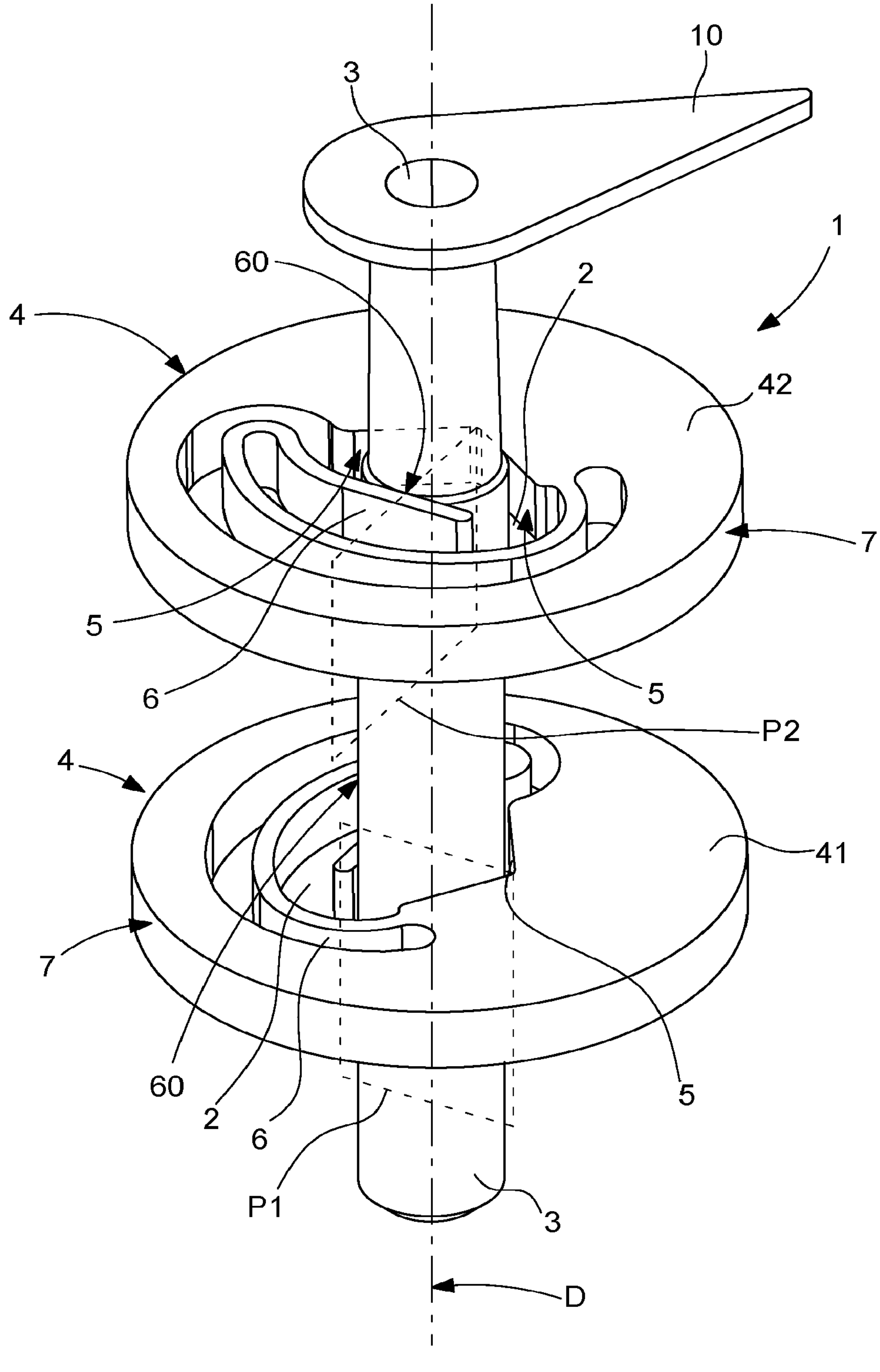
FIG. 1 shows, schematically, partially and in perspective, a display mechanism according to the invention, illustrating the guide of a shaft carrying a display, here a hand, guided by two guide bearings according to the invention, each comprising an elastic blade in contact with the shaft and imposing very slight braking thereon, unlike a double support surface, here consisting of a V-shape; these support surfaces each have a bisector plane passing through the theoretical axis of rotation of the shaft, and, advantageously, these two bisector planes are angularly offset from each other.

The invention relates to a timepiece display mechanism 100, comprising at least one display 10 comprising a shaft 3, and comprising at least one plate 101 and/or a bridge 102 carrying at least one guide device 1 for carrying and guiding such a shaft 3. This timepiece display 10 is in particular, and in a non-limiting manner, a hand, a disc, or the like, and comprises a shaft 3, or is mounted on a shaft 3.

This guide device 1 comprises a housing 2, which is arranged for the passage of a shaft 3 of a display 10, or which is arranged to directly carry a display 10. The guide device 1 comprises at least one guide bearing 4 for guiding such a shaft 3 around an axis D.

According to the invention, this at least one guide bearing 4 comprises, on a first side of the axis D, a support surface 5, comprising a V-shape or a pad, or the like, and which is arranged to centre the axis of revolution of a shaft 3 on a bisector plane P of the support surface 5. This support surface 5 is symmetrical with respect to the bisector plane P, which passes through the axis D. The same guide bearing 4 comprises, on a second side of the axis D, opposite the first side, at least one holding element 6, which is disposed substantially diametrically opposite the support surface 5. It is understood that the support surface 5, symmetrical with respect to its bisector plane P, in fact comprises two elementary support surfaces, referenced 51 and 52 in some figures.

According to the invention, all the holding elements 6 are arranged to exert on a shaft 3 a resultant elastic return force directed towards the axis D, and to prevent a radial exit, out of this at least one guide bearing 4, of a shaft 3 inserted axially in the direction of the axis D in this same guide bearing 4.

The slight friction exerted on the shaft by each holding element 6 ensures braking allowing to avoid any phenomenon of chattering and floating of the display 10. Especially when the display 10 is of small diameter and of low inertia, such as a small seconds or power reserve display hand, or the like, the diameter of the shaft is very small, and the alteration of the performance of the horological movement by this imposed friction is almost negligible. This friction being constant, the chronometric properties are practically not affected.

More particularly, each holding element 6 is a leaf spring arranged to rest on the periphery of a shaft 3.

More particularly, at least one guide bearing 4 comprises a single holding element 6. The figures illustrate a particular, non-limiting case, where each guide bearing 4 comprises a single holding element.

The contact surfaces between the shaft 3 and the guide bearing 4, both at the support surface 5, and at a contact surface 60 which is opposite thereto, can be in different shapes, from a simple point contact up to a very enveloping contact between complementary surfaces: the point contact ensures less friction but generates wear and pollution of the movement; the enveloping contact corresponds to high friction and a loss of efficiency of the mechanism. In the particular application to displays, a good compromise lies in a substantially linear contact: each contact surface is developed around a straight line segment. The invention is illustrated in the figures for the particular case where these straight line segments are all mutually parallel, and parallel to the theoretical axis D of rotation of the shaft 3; this solution is preferred because it generates little wear, low and controlled friction, and has little effect on the efficiency.

However, it is possible to imagine substantially linear but non-parallel contact surfaces, for example on generatrices of a cone, to tend to push the shaft in a certain direction for clearance adjustments for example, but of course with an alteration of the efficiency.

Figure 5:
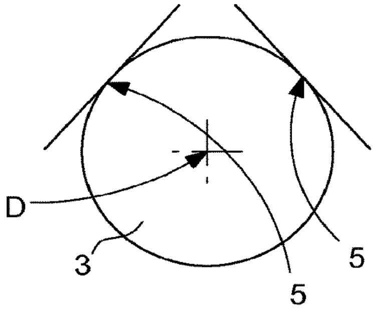
FIGS. 5 to 7 very schematically illustrate, in a plane perpendicular to the axis of rotation of the shaft, three types of connection between the shaft and the support surface.
Figure 6:
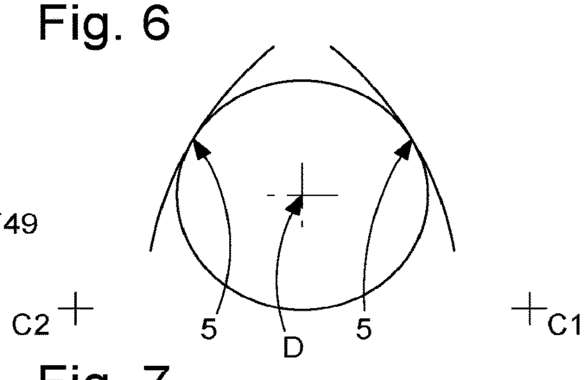
Figure 7:
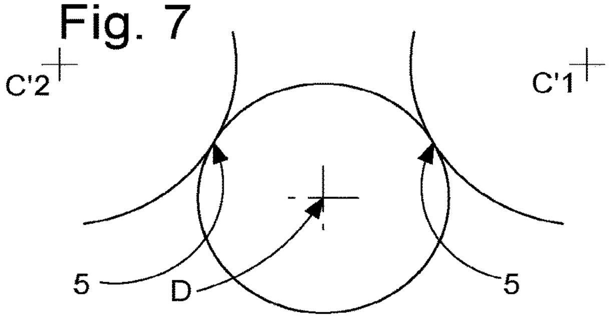
Figure 8:
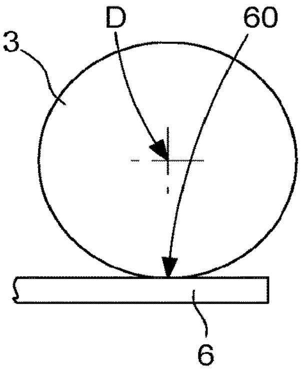
FIGS. 8 to 10 very schematically illustrate, in a plane perpendicular to the axis of rotation of the shaft, three types of connection between the shaft and the elastic blade.
Figure 9:
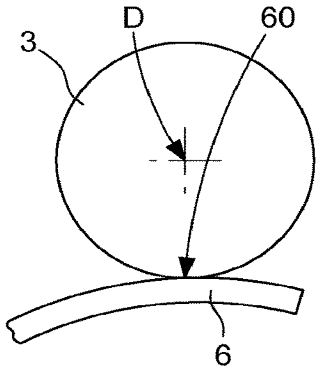
Figure 10:
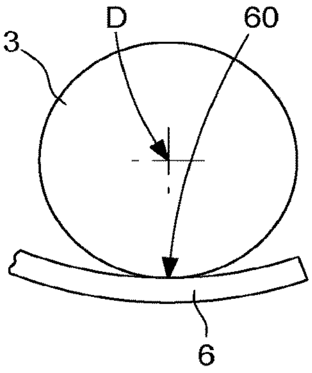

These contacts can be of the cylinder-plane type, as symbolised in FIGS. 5 and 8, but also of the male cylinder-female cylinder type as seen in FIGS. 6 and 10, or else of the male cylinder-male cylinder type as seen in FIGS. 7 and 9, it is noted that the cylindrical configuration is only a particular case, which is advantageous to achieve, of a more generally concave or convex surface: it is thus possible to have plano-convex, concave-convex, convex-convex type connections.

Thus, the preferred case illustrated, comprising three substantially linear contact surfaces, is a particular, non-limiting case, which is the most advantageous for these display applications.

This at least one guide bearing 4 is a platform with parallel faces.

More particularly, all the other surfaces that it comprises, other than these two parallel surfaces which axially limit it, are parallel to the same axial direction (perpendicular to the two parallel faces): the guide bearing 4 can be extruded, stamped, or else milled in simple 2D contouring machining, which allows manufacturing at reduced cost. In addition, the guide bearing 1 can be mounted reversibly while ensuring its function.

In a particular and economical variant, the outer surface 7 is unique, and is a surface of revolution around the axis D.

FIGS. 1, 2, 4, 16 illustrate very simple embodiments where the guide bearing 4 comprises an outer surface 7, called here lateral surface, which is cylindrical, perpendicular to the two parallel faces of this guide bearing 4.

Figure 3:
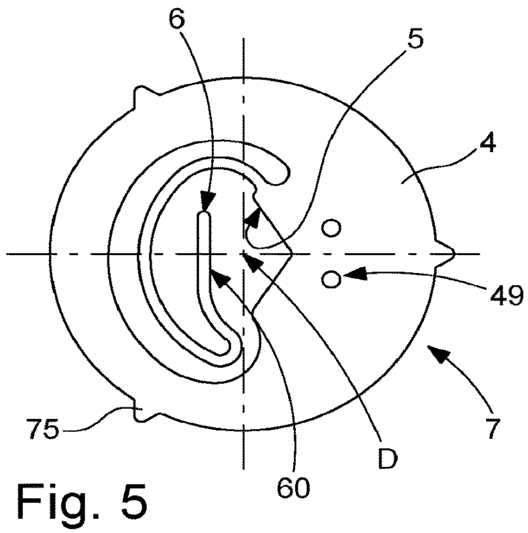
FIG. 3 shows, similarly to FIG. 2, another guide bearing of similar arrangement and comprising lugs on its periphery, for clamping it in a cabochon or a structure.
Figure 13:
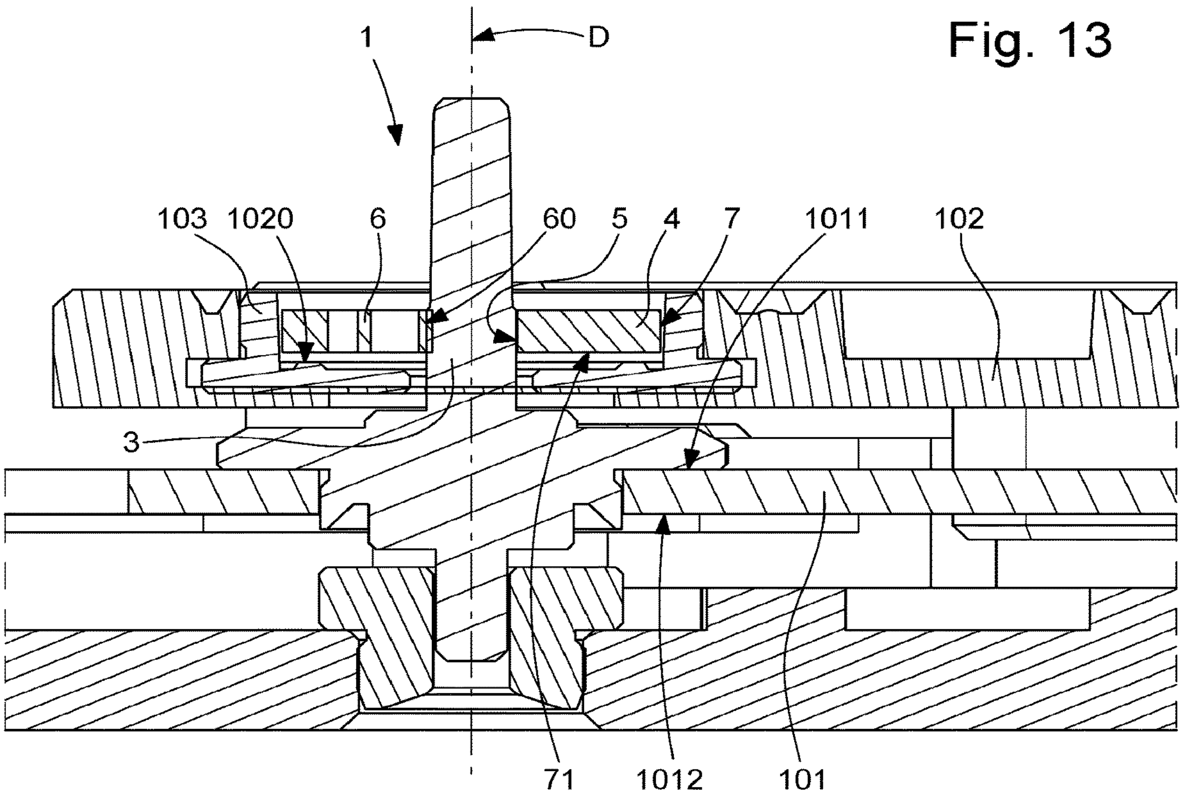
FIG. 13 shows, schematically, partially, and in sectional view passing through the axis of rotation of the shaft, a guide device comprising a guide bearing according to FIG. 3, mounted in a cabochon, and another conventional bearing.
Figure 14:
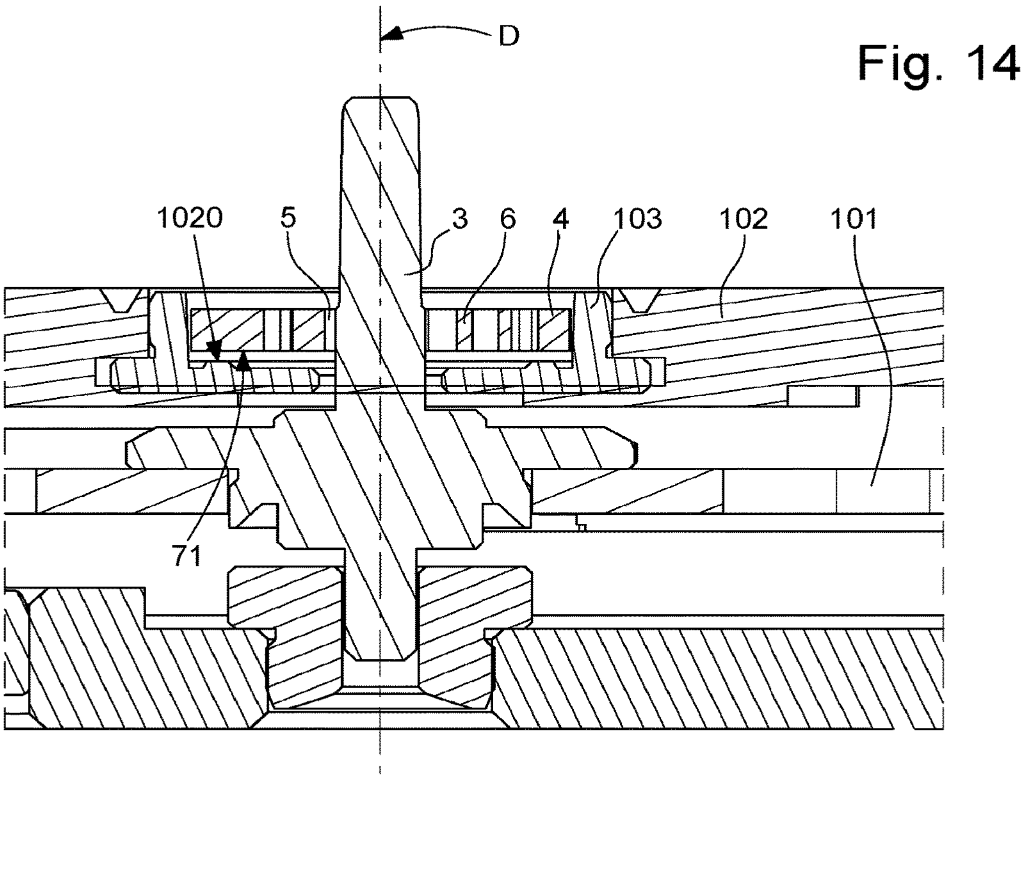
FIG. 14 is a view in another sectional plane of the guide device of FIG. 13; I FIGS. 15 to 20 very schematically illustrate, in sectional view in a plane passing through the axis of rotation of the shaft, different assembly variants of such guide devices or guide bearings.

FIGS. 3, 13 and 14 illustrate a variant where this outer surface 7 comprises reliefs 75, here illustrated protruding, but which can just as well be recessed, with respect to such a cylindrical surface, and which are intended to cooperate with complementary recessed, respectively protruding reliefs, comprised in a housing formed in a plate 101 or a bridge 102 and arranged to receive this guide bearing 1; in this example the guide bearing 1 can be assembled in three positions at 120° from each other. The guide bearing 1 here has the shape of a star.

Naturally, the connection between a guide bearing 1 and a plate 101 or a bridge 102 can also be indirect, in particular through a cabochon 103 as illustrated in FIG. 13 or 14.

In a variant not shown, the guide bearing 1 may also comprise a single relief 75 arranged to cooperate with a single complementary relief to obtain a single angular orientation of the guide bearing 1 with respect to the plate 101 or to the point 102, so as to allow mobility of the axis of a shaft 3 in an imposed plane. In yet other variants, the number and the angular arrangement of the reliefs 75, or of the complementary reliefs of the plate 101 or of the bridge 102, allows other relative angular combinations between these constituents.

Figure 11:
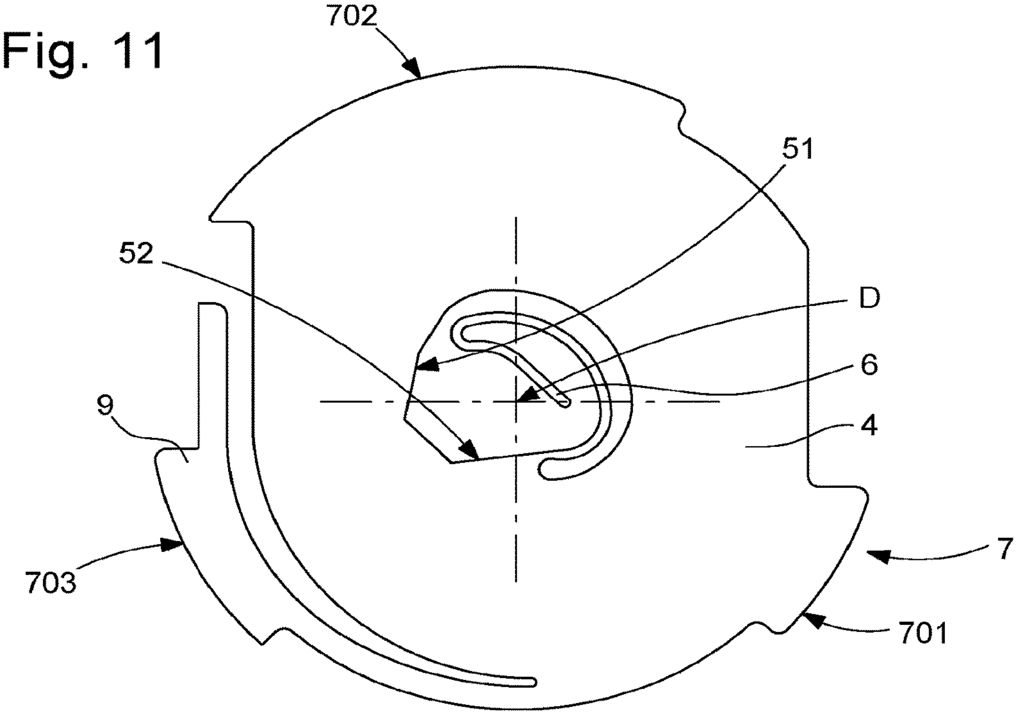
FIG. 11 shows, similarly to FIG. 2, another guide bearing of similar arrangement and comprising substantially cylindrical support surfaces on its periphery, as well as an external elastic blade, for its good hold in a cabochon or structure.
Figure 12:
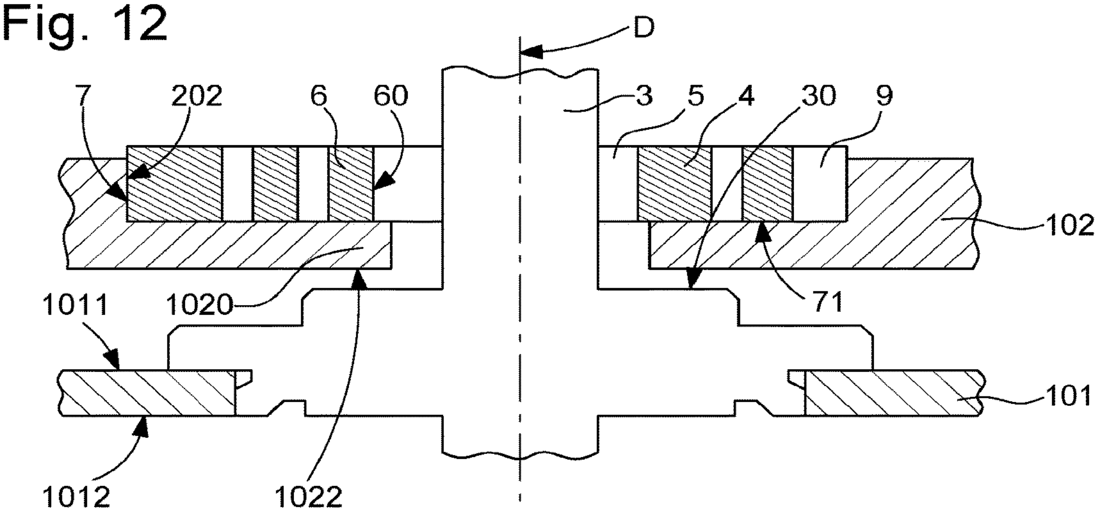
FIG. 12 shows, schematically, partially, and in sectional view passing through the axis of rotation of the shaft, a guide device comprising such a single guide bearing.
Figure 15:
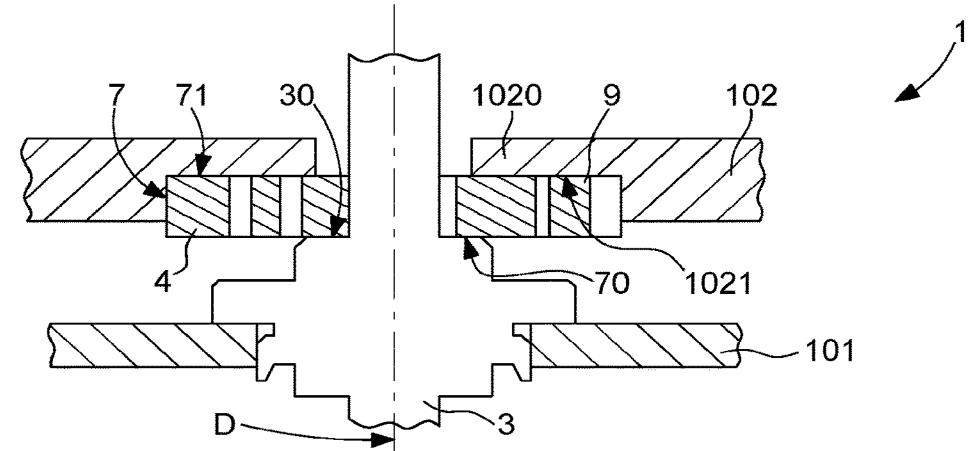
Figure 16:
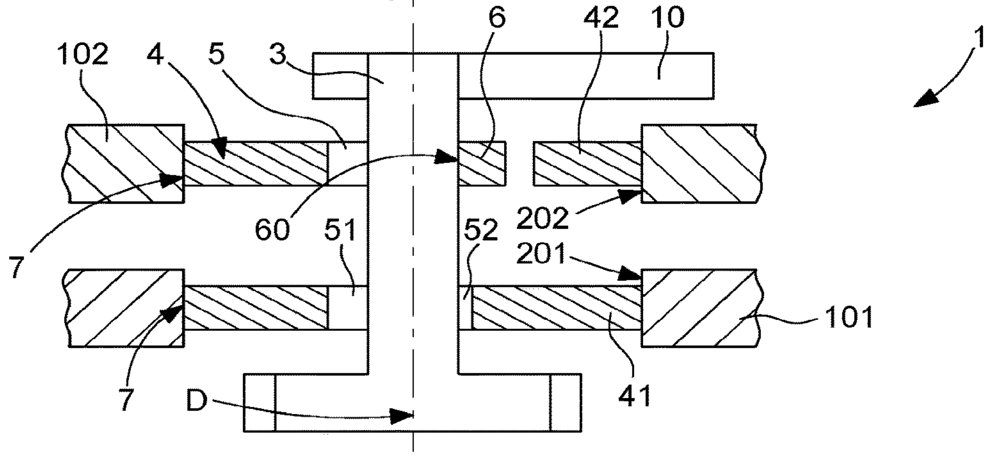
Figure 17:
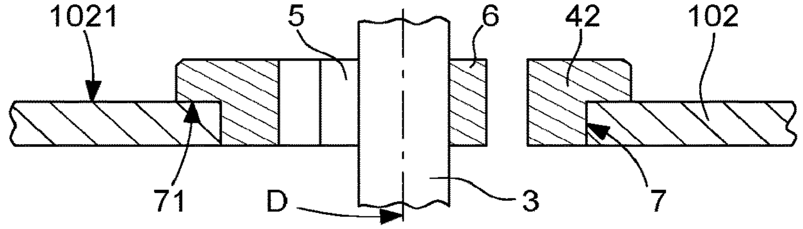
FIGS. 17 to 20 illustrate specific cases where the guide bearings comprise a shoulder forming an abutment, unlike all FIGS. 1 to 16 where each lateral outer surface of the guide bearings is parallel to the axial direction.

FIGS. 11, 12, and 15 illustrate a variant where the guide bearing 1 comprises at least one elastic blade 9 for holding it tightly in a chamber or housing;

FIG. 11 shows a guide bearing 1 comprising two sectors 701, 702, of the same cylinder for supporting it in a cylindrical chamber or a bore, and such an elastic blade 9 carrying at its distal end a third cylindrical sector 703 identical to the above, to ensure perfect centring, well maintained by the elasticity of the blade 9.

FIGS. 17 to 20 illustrate another variant where the outer surface 7 is shouldered.

More particularly, the guide device 1 comprises a plurality of guide bearings 4 separated axially in the direction of the axis D; this is the conventional mounting with a lower bearing 41 and an upper bearing 42, as visible for example in FIG. 1. More particularly, at least two of these guide bearings have distinct bisector planes P, as visible in FIG. 1, where the bisector plane P1 of the lower V-shaped support surface 5 of the lower bearing 41 forms a non-zero or flat angle with the bisector plane P2 of the upper V-shaped support surface 5 of the upper bearing 42 This arrangement provides the advantage of creating non-coplanar reaction forces, and of avoiding a concentration of forces in a single direction.

The guide device 1 may also comprise only such a single guide bearing 4, as seen in the examples of FIGS. 12 and 15.

More particularly, at least one guide bearing 4 is removable, and comprises at least one outer surface 7, which is arranged to cooperate in a complementary manner with a housing 20, 201, 202, of a plate 101 or of a bridge 102, or any similar structural or support element, at least in a plane perpendicular to the axis D.

Figure 4:
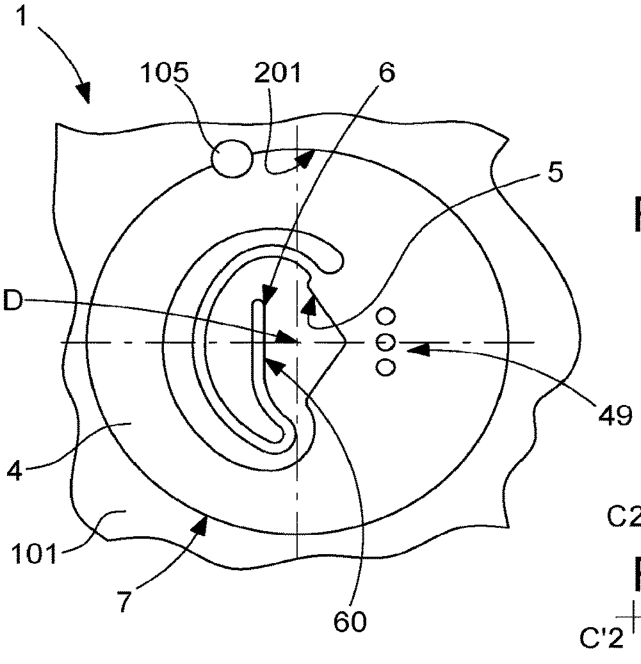
FIG. 4 shows, similarly to FIG. 2, a guide bearing attached to a structure by a pin at the interface zone.

The least expensive implementation of such a housing 20, 201, 202, is a drilling, FIG. 4 illustrates this simple and non-limiting example of a circular housing 201, made after drilling an orifice for housing a pin 105, the bearing 4 comprises on the periphery the complementary part of this orifice, and a pin 105 housed at the interface zone ensures the precise angular orientation of the guide bearing 4 with respect to the plate 101 or to the bridge 102. Naturally many other implementations are possible, for example with an orientation plate on the periphery of the bearing 4, or the like, and their choice is guided by the dimensioning and the machining cost.

More particularly, this at least one outer surface 7 comprises at least one first axial abutment surface 71, which is arranged to cooperate in axial abutment support, in the direction of the axis D, with a complementary support surface 1020, 1021, comprised in a plate 101 or a bridge 102, or a cabochon 103 arranged to be mounted in a plate 101 or a bridge 102, or the like.

More particularly, this at least one outer surface 7 further comprises a second axial abutment surface 72 arranged to cooperate in axial abutment support, in the direction of the axis D, with a complementary support surface 1012, 1022, comprised in a plate or a bridge, on the side opposite that of the first axial abutment surface 71. FIG. 9 illustrates such a configuration with a bearing made in two parts 42 and 43. In the case of a one-piece implementation, the part 43 is advantageously a deformable elastic lip allowing the axial insertion of this bearing 4 in the housing 202 of the bridge 102, and its clipping onto this bridge after releasing this lip.

Figure 18:
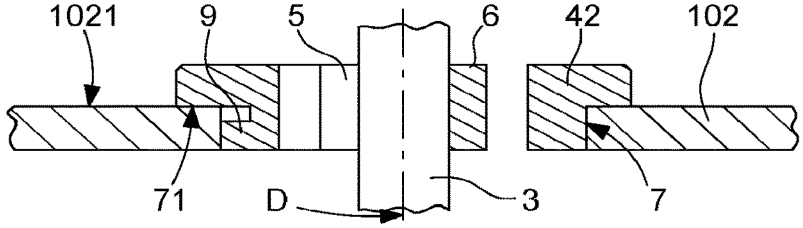

More particularly, the guide bearing 4, carrying this at least one outer surface 7, comprises at least one elastic blade 9 for elastically holding it in a chamber 20, 201, 202, or a bore, comprised in a plate 101 or a bridge 102 to receive this guide bearing 4, as seen in FIG. 18. And the first axial abutment surface 71 is advantageously arranged to limit the axial deformation of at least one elastic blade 9 disposed in its immediate axial vicinity in the direction of the axis D, which protects it against shocks. Naturally, this elastic blade 9 can also be arranged to cooperate with the chamber 20, 201, 202 and a lateral surface 1011, 1012, 1021, 1022, of the plate or of the bridge. In yet another variant, the same bearing 4 comprises several such elastic blades 9, and in particular at least one to radially cooperate with the bore, and one to axially cooperate with an abutment support surface perpendicular to the axis D. The guide bearing 4 of FIG. 11 comprises such an elastic blade 9, as well as substantially cylindrical support surfaces 701, 702, 703, on its periphery 7.

Figure 19:
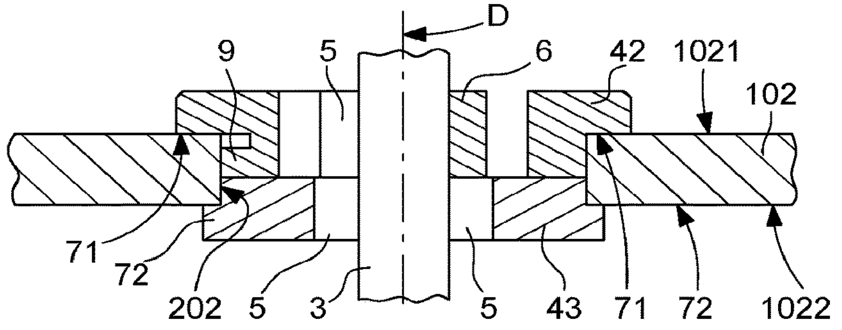
Figure 20:
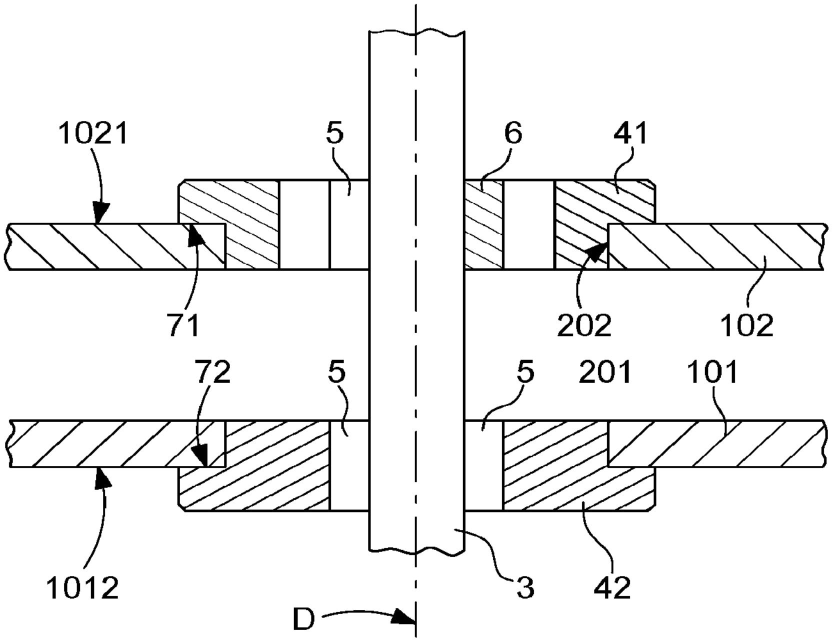
Figure 21:
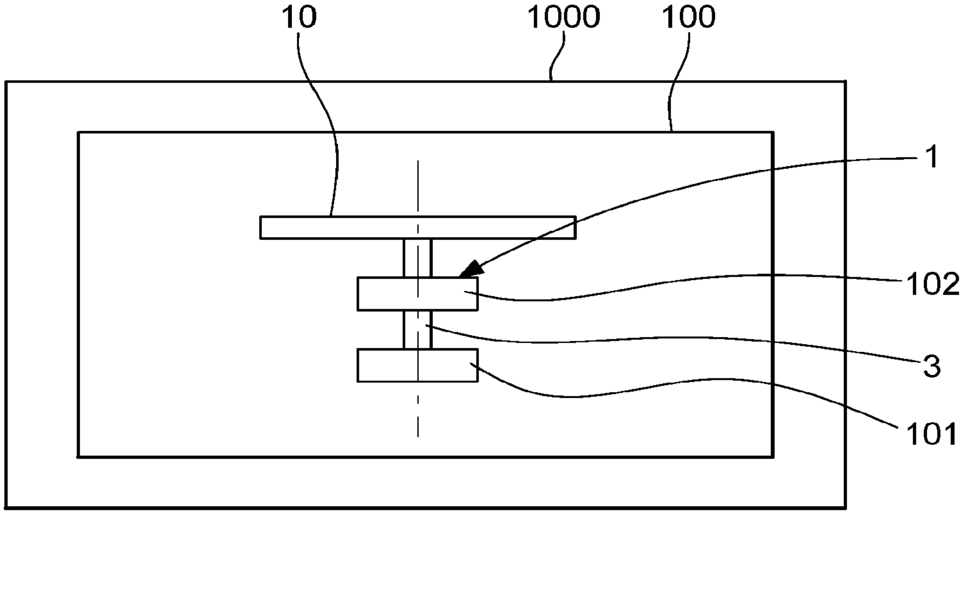
FIG. 21 is a block diagram representing a watch comprising a display mechanism with such a guide device.

More particularly, at least one elastic blade 9 is interposed axially between the first axial abutment surface 71 and the second axial abutment surface 72, as seen in FIG. 19.

The type of implementation of the guide bearing 4 according to the invention is variable according to the desired mode of assembly.

In a first variant, the guide bearing 4 comprises at least one rigid peripheral part comprising at least one such outer surface 7.

In a second variant, the guide bearing 4 comprises at least one elastic peripheral part comprising at least one such outer surface 7.

More particularly, at least one guide bearing 4 is made in one piece, and comprises, on the same component, both the support surface 5 and all the holding elements 6 of this bearing. More particularly still, when the guide bearing comprises one or more elastic blades 9, this guide bearing 4 is advantageously made in one piece, and comprises, on the same component, both the support surface 5 and all the holding elements 6 and all elastic blades 9 of this bearing.

More particularly, at least one guide bearing 4 is made of micro-machinable material. It can in particular be made of silicon and or silicon dioxide, of "diamond like carbon" DLC, or the like, by a method of the "LIGA" or "MEMS" type or the like.

In another alternative embodiment, at least one guide bearing 4 is made of elastic metal alloy.

In another variant embodiment, at least one guide bearing 4 is made of a plastic or composite material allowing the production of elastic blades in the usual temperature and hygrometry ranges for watches.

More particularly, the outer surface 7 of the guide bearing 4 comprises at least one protruding or recessed relief 75, which is arranged to cooperate in a complementary manner with an indexing element comprised in a plate or a bridge for a single angular orientation of the bearing guide 4 carrying this at least one outer surface 7 with respect to this indexing element. This variant is illustrated in FIG. 3, where the guide bearing 4 comprises three lugs 75 distributed at 120°. A particular method for mounting such a guide bearing is as follows:

- the brake guide bearing 4 is pre-mounted in a cap head or a cabochon;
- this cap or cabochon is mounted in a blank, with a tightening; the tightening induced by the tightening of the cap in tightens the brake guide bearing 4 in the housing of the cap. The peripheral lugs allow not to over-stress the brake in its housing, which could cause the breakage of a holding element 6. These lugs penetrate into the cap, and the brake guide bearing 4 is finally crimped through the lugs.

The advantage of this solution is to be able to dismount the brake guide bearing 4 by removing the cap from the blank. Indeed, it is possible but more delicate to perform the riveting or the driving of the brake guide bearing 4 directly into the blank. The use of an intermediate cap or cabochon allows this operation of driving/riveting the brake into the cap to be remote. In the event of a driving/riveting operation defect, the component to be thrown is only the brake contained in the cap and not the complete blank which is more expensive. FIGS. 13 and 14 illustrate such an assembly with an intermediate cabochon 103.

Figure 2:
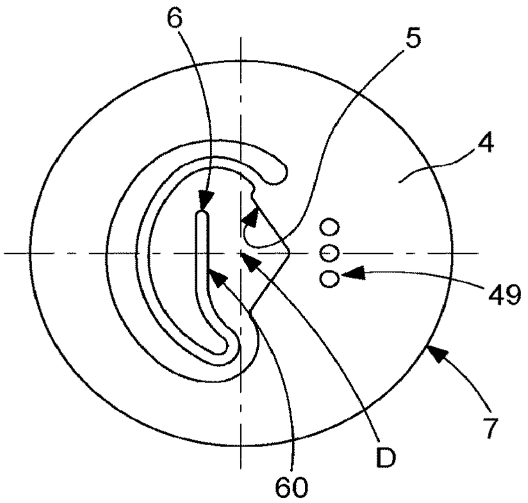
FIG. 2 shows, schematically, and in plan view, one of the guide bearings of FIG. 1.

FIGS. 2 to 4 illustrate guide bearings 4 according to the invention, which comprise one or more holes 49, for identification purposes, the very small dimensions of these bearings not allowing any other type of identification marking.

Advantageously, the plate 101 and/or the bridge 102 comprises at least one chamber 201, 202, which is arranged to receive such a guide bearing 4 of the guide device 1 for guiding the shaft 3 in the direction of the axis D.

More particularly, this mechanism 100 comprises a plate 101 and a bridge 102 axially spaced apart in the direction of the axis D.

In a first variant, this mechanism 100 comprises at least one guide bearing 4 forming with the plate 101 or the bridge 102 an unremovable assembly. The bearing 4 is in particular driven and/or glued and/or soldered, in particular by laser soldering, and/or brazed, and/or riveted, to the plate 101 or to the bridge 102, or the like.

In a second variant, the mechanism 100 comprises at least one guide bearing 4 removable with respect to the plate 101 or to the bridge 102. In a variant, the guide bearing 4 comprises for this purpose at least one elastic element, in particular an elastic blade 9; in another variant, it is the plate 101 or the bridge 102 which comprises such an elastic element; in yet another variant, both the guide bearing and the plate 101, or the bridge 102, each comprise at least one such elastic element.

The invention also relates to a horological movement 1000 comprising at least one such timepiece display mechanism 100, and/or at least one such guide device 1.

The invention also relates to a timepiece 1000 comprising at least one such timepiece display mechanism 100, and/or at least one such guide device 1. More particularly, this timepiece 1000 is a watch.

In short, the invention allows to rigidly position a support surface 5, for example a V-shaped support surface, in the horological movement, in particular at a plate or a bridge, or other structural element, so that the position of the shaft of the wheel set is imposed by the position of this support surface 5, and provides radial guidance.

The guide bearing 4, which comprises this support surface 5, can be attached in different ways, and in particular and in a non-limiting manner:

- by an attachment which is unremovable, or at least very difficult to remove, for example by driving, riveting, or the like, or else stopping by laser solder points, brazing, or the like. A particular implementation is that of a circular brake attached in the blank, for example by riveting: cap head or cabochon 103, brake. This brake has a circular periphery. It is riveted in the blank around its periphery, and thus each V-shape for positioning the shaft is integral with the horological movement. The shake takes place between the cap head or cabochon 103 of the plate and the brake attached in a bridge, for example a calendar platform. This configuration also allows the shaft to be held when removing the display, in particular a hand.
- by reversible elastic attachment, similarly to a circlip. This variant allows to avoid any deformation of a guide bearing irreversibly attached by deformation or by any unremovable attachment. The use of at least one elastic blade in the manner of a circlip allows to ensure autonomously holding the guide bearing 4 with a brake function in the blank. It is thus possible to ensure the functions of holding in the blank, radial and axial guidance, and braking.

The figures illustrate only a few particular configurations, and are not limiting.

In particular, a guide bearing according to the invention with a brake function can be mounted on the dial side, instead of being conventionally mounted sandwiched between the blanks; the shake then takes place between a cap head, or a cabochon 103, and the neighbouring blank, as seen in FIG. 15.

The invention brings several advantages:

- the control of the braking torque by friction, in particular when the guide bearing 54 is produced by a highly reproducible "LIGA" method;
- the friction torque then depends only on the variation of the diameter of the pinion attached to the shaft of the display, which ensures the improvement of the floating of the display, in particular a hand, visible by the user of a watch;
- holding the display, in particular a hand "flatly", that is to say parallel to the plates and bridges, preventing it from contacting another display, another hand or the dial or a structural element of the watch;

the alternative with elastic blade of the circlip type is removable.

These miniature components are easily integrated into a minimal space requirement and can be installed in the power reserve positions, small seconds with variable space between shafts, or the like.

The invention claimed is:

1. A timepiece display mechanism, comprising:

a display comprising a shaft, and at least one of a plate and a bridge carrying at least one guide device for carrying and guiding said shaft, said at least one guide device comprising a housing arranged for passage of the shaft of the display or arranged to carry the display, and comprising at least one guide bearing for guiding said shaft around an axis, wherein said at least one guide bearing is a platform with parallel faces, and includes, on a first side of said axis, a support surface comprising a V-shape or a pad and arranged to center the axis of said shaft on a bisector plane of said support surface which is symmetrical with respect to said bisector plane which passes through said axis, and on a second side of said axis, opposite said first side, a holding element disposed substantially diametrically opposite said support surface, wherein said holding element contacts said shaft so as to exert on said shaft a resultant elastic return force directed towards said axis, and to prevent a radial exit, out of said at least one guide bearing, of the shaft inserted axially in a direction of said axis in said at least one guide bearing, and wherein at least one said guide bearing is removable and comprises at least one outer surface which is a peripheral surface arranged to cooperate in a complementary manner with a chamber or a bore comprised in at least one of said plate and said bridge, at least in a plane perpendicular to said axis.

2. The display mechanism according to claim 1, wherein each said holding element is a leaf spring arranged to rest on a periphery of said shaft.

3. The display mechanism according to claim 1, wherein at least one said guide bearing comprises a single holding element.

4. The display mechanism according to claim 1, wherein said guide device comprises a plurality of guide bearings separated axially in a direction of said axis and of which at least two guide bearings of said plurality of guide bearings have distinct said bisector planes.

5. The display mechanism according to claim 1, wherein said at least one outer surface is unique, and is a surface of revolution around said axis.

6. The display mechanism according to claim 1, wherein said at least one outer surface comprises at least one protruding or recessed relief arranged to cooperate in a complementary manner with an indexing element comprised in at least one of said plate and said bridge for a single angular orientation of said at least one guide bearing carrying said at least one outer surface with respect to said indexing element.

7. The display mechanism according to claim 1, wherein said at least one guide bearing comprises at least one rigid peripheral part comprising said at least one outer surface.

8. The display mechanism according to claim 1, wherein said at least one guide bearing comprises at least one elastic peripheral part comprising said at least one outer surface.

9. The display mechanism according to claim 8, wherein said at least one guide bearing carrying said at least one outer surface comprises at least one elastic blade for elastically holding said at least one bearing in a chamber or a bore comprised in at least one of said plate and said bridge to receive a said at least one guide bearing, and wherein a first axial abutment surface is arranged to limit axial deformation of said at least one elastic blade disposed in an immediate axial vicinity of said first axial abutment surface in the direction of said axis.

10. The display mechanism according to claim 9, wherein said at least one guide bearing carrying said at least one elastic blade comprises two sectors of a cylinder for supporting said at least one guide bearing in a cylindrical chamber or a bore of at least one of said plate and said bridge, and wherein said at least one elastic blade carries at a distal end thereof a third cylindrical sector identical to said two sectors, to ensure centering in at least one of said plate and said bridge.

11. The display mechanism according to claim 1, wherein said at least one guide bearing is held to at least one of said plate or to said bridge by at least one pin housed at an interface zone.

12. The display mechanism according to claim 1, wherein said at least one outer surface comprises at least one first axial abutment surface arranged to cooperate in axial abutment support, in the direction of said axis, with a support surface comprised in at least one of said plate and said bridge or a cabochon arranged to be mounted in at least one of said plate and said bridge.

13. The display mechanism according to claim 12, wherein said at least one outer surface further comprises a second axial abutment surface arranged to cooperate in axial abutment support, in the direction of said axis, with a support surface comprised in at least one of said plate or said bridge, on a side opposite that of said first axial abutment surface.

14. The display mechanism according to claim 13, wherein at least one elastic blade is interposed axially between said first axial abutment surface and said second axial abutment surface.

15. The display mechanism according to claim 1, wherein said at least one guide bearing is made in one piece, and comprises, on a same component, both said support surface and said holding element.

16. The display mechanism according to claim 15, wherein at least one said guide bearing is made of micromachinable material.

17. The display mechanism according to claim 1, wherein said display mechanism comprises said at least one guide bearing forming with at least one of said plate and said bridge an unremovable assembly.

18. The display mechanism according to claim 1, wherein said display mechanism comprises said at least one guide bearing removable with respect to at least one of said plate and said bridge.

19. A timepiece comprising at least one display mechanism according to claim 1.

20. The timepiece according to claim 19, wherein the timepiece is a watch.

* * * * *